US012287595B2

(12) United States Patent
Kato et al.

(10) Patent No.: US 12,287,595 B2
(45) Date of Patent: Apr. 29, 2025

(54) FIXING DEVICE INCLUDING HOLDER HAVING HEATER SUPPORTING SURFACE SUPPORTING HEATER, AND CONTACTING SURFACE OPPOSITE HEATER SUPPORTING SURFACE AND IN CONTACT WITH STAY

(71) Applicant: BROTHER KOGYO KABUSHIKI KAISHA, Nagoya (JP)

(72) Inventors: Yasutada Kato, Nagoya (JP); Makoto Souda, Nagoya (JP); Kazuna Taguchi, Nagoya (JP); Yuichi Ikeno, Maibara (JP); Takuya Nishimura, Nukata (JP); Shinichi Hatakeyama, Nagoya (JP); Shunsuke Ueki, Nagoya (JP); Keiichi Imamiya, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/582,980

(22) Filed: Feb. 21, 2024

(65) Prior Publication Data

US 2024/0288803 A1 Aug. 29, 2024

(30) Foreign Application Priority Data

Feb. 28, 2023 (JP) ................................ 2023-030499

(51) Int. Cl.
*G03G 15/20* (2006.01)

(52) U.S. Cl.
CPC ..... *G03G 15/2017* (2013.01); *G03G 15/2053* (2013.01); *G03G 15/206* (2013.01); *G03G 15/2064* (2013.01)

(58) Field of Classification Search
CPC ........... G03G 15/2017; G03G 15/2053; G03G 15/206; G03G 15/2064
USPC ................. 399/107, 110, 122, 320, 328, 329
See application file for complete search history.

(56) References Cited

U.S. PATENT DOCUMENTS

| | | | | |
|---|---|---|---|---|
| 11,971,674 | B2 * | 4/2024 | Nanno | G03G 15/2057 |
| 2005/0123329 | A1 | 6/2005 | Uchida et al. | |

FOREIGN PATENT DOCUMENTS

| | | | |
|---|---|---|---|
| JP | 2005181989 | A | 7/2005 |
| JP | 2005284089 | A | 10/2005 |
| JP | 2007041288 | A | 2/2007 |
| JP | 2008020821 | A | 1/2008 |
| JP | 2020020999 | A | 2/2020 |
| JP | 2022-023278 | * | 2/2022 |

* cited by examiner

*Primary Examiner* — Hoan H Tran
(74) *Attorney, Agent, or Firm* — Element IP, PLC

(57) ABSTRACT

A fixing device includes: an endless belt; a heater; a stay; a holder having a heater supporting surface and a contacting surface in contact with the stay; and a pressure roller having a diameter that becomes smaller from each end of the pressure roller in an axial direction toward a center of the pressure roller in the axial direction. In a state prior to assembling the holder with both the stay and the heater, a distance in an orthogonal direction between the heater supporting surface and the contacting surface at a center of the holder in the axial direction is longer than a distance in the orthogonal direction between the heater supporting surface and the contacting surface at each end of the holder in the axial direction. The orthogonal direction is orthogonal to the axial direction.

13 Claims, 9 Drawing Sheets

| | END POSITION 1 | END POSITION 2 | CENTER POSITION | END POSITION 3 | END POSITION 4 |
|---|---|---|---|---|---|
| EXAMPLE 1 (ΔT=150 μm) | 6.60mm | 6.29mm | 6.32mm | 6.79mm | 6.95mm |
| EXAMPLE 2 (ΔT=350 μm) | 6.81mm | 6.49mm | 6.93mm | 6.63mm | 6.79mm |
| COMPARATIVE EXAMPLE (ΔT=0 μm) | 6.76mm | 6.44mm | 5.86mm | 6.91mm | 7.07mm |

FIXING DEVICE INCLUDING HOLDER HAVING HEATER SUPPORTING SURFACE SUPPORTING HEATER, AND CONTACTING SURFACE OPPOSITE HEATER SUPPORTING SURFACE AND IN CONTACT WITH STAY

REFERENCE TO RELATED APPLICATIONS

This application claims priority from Japanese Patent Application No. 2023-030499 filed on Feb. 28, 2023. The entire content of the priority application is incorporated herein by reference.

BACKGROUND ART

There has been conventionally known a fixing device provided inside a main body of an image-forming apparatus and configured to fix a toner image onto a sheet. Such a conventional fixing device includes a pressure roller having a so-called inverted crown shape in which an outer diameter at each axial end thereof is greater than that at an axial center thereof. By virtue of the inverted crown shape of the pressure roller, the fixing device conveys a sheet while stretching the same from the center toward the respective axial ends, thereby restraining generation of wrinkles on the sheet.

SUMMARY

However, in the fixing device including the pressure roller having the inverted crown shape described above, there occurs a problem that a nipping width at each axial end becomes greater among the entire axial length of the pressure roller.

In view of the foregoing, it is an object of the present disclosure to provide a fixing device in which an increase in a nipping width at each end of a pressure roller in an axial direction can be restrained.

In order to attain the above and other object, the present disclosure provides a fixing device including: an endless belt; a heater; a holder; a stay; and a pressure roller. The heater is positioned in a space encircled by the endless belt. The heater includes: a base plate; and a resistance heating element provided on the base plate. The holder holds the heater. The holder has: a heater supporting surface; and a contacting surface. The heater supporting surface supports the heater. The contacting surface is opposite the heater supporting surface. The stay is in contact with the contacting surface. The pressure roller is rotatable about a rotation axis extending in an axial direction. The pressure roller is configured to nip the endless belt between the pressure roller and the heater. The pressure roller includes: a shaft; and an elastic layer covering an outer circumferential surface of the shaft. The pressure roller has a diameter that varies in the axial direction such that the diameter becomes smaller from each end of the pressure roller toward a center of the pressure roller. In a state prior to assembling the holder with both the stay and the heater, a distance in an orthogonal direction between the heater supporting surface and the contacting surface at a center of the holder in the axial direction is longer than a distance in the orthogonal direction between the heater supporting surface and the contacting surface at each end of the holder in the axial direction. The orthogonal direction is orthogonal to the axial direction.

In the above structure, the pressure roller has a so-called inverted crown shape in which the diameter of the pressure roller varies in the axial direction such that the diameter becomes smaller from each end of the pressure roller toward the center of the pressure roller. Accordingly, the fixing device can convey the sheet while applying a stretching force to the sheet directed from a center of the sheet in the axial direction toward each end of the sheet S in the axial direction, thereby restraining formation of wrinkles on the sheet.

Further, the contacting surface is provided such that the distance in the orthogonal direction between the heater supporting surface and the contacting surface at the center of the holder in the axial direction is greater than the distance between the heater supporting surface and the contacting surface at each end of the holder in the axial direction in a state prior to assembling the holder with both the stay and the heater. This structure can restrain a nipping pressure at the center in the axial direction from becoming smaller relative to that at each end in the axial direction. Accordingly, an increase in a nipping width at each end in the axial direction of the pressure roller can be suppressed irrespective of the inverted crown shape of the pressure roller.

According to another aspect, the present disclosure also provides a fixing device including: an endless belt; a heater; a holder; a stay; and a pressure roller. The heater is positioned in a space encircled by the endless belt. The heater includes: a base plate; and a resistance heating element provided on the base plate. The holder holds the heater. The holder has: a heater supporting surface; and contacting surfaces. The heater supporting surface supports the heater. The contacting surfaces are opposite the heater supporting surface. The stay is in contact with each contacting surface. The pressure roller is rotatable about a rotation axis extending in an axial direction. The pressure roller is configured to nip the endless belt between the pressure roller and the heater. The pressure roller includes: a shaft; and an elastic layer covering an outer circumferential surface of the shaft. The pressure roller has a diameter that varies in the axial direction such that the diameter becomes smaller from each end of the pressure roller toward a center of the pressure roller. In a state prior to assembling the holder with both the stay and the heater, a distance in an orthogonal direction between the heater supporting surface and a first contacting surface of the contacting surfaces is longer than a distance in the orthogonal direction between the heater supporting surface and a second contacting surface of the contacting surfaces. The first contacting surface is positioned closer to a center of the holder in the axial direction than the second contacting surface is to the center of the holder in the axial direction. The orthogonal direction is orthogonal to the axial direction.

The fixing device according to the other aspect also can exhibit the same advantages as the fixing device according to the aspect, since the pressure roller has a so-called inverted crown shape in which the diameter of the pressure roller varies in the axial direction such that the diameter becomes smaller from each end of the pressure roller toward the center of the pressure roller.

Further, since the contacting surfaces are arranged such that the distance between the heater supporting surface and the first contacting surface, which is positioned closer to the center of the holder in the axial direction than the second contacting surface, is greater than the distance between the heater supporting surface and the second contacting surface, the nipping pressure at the center in the axial direction from becoming smaller relative to that at each end in the axial direction. Accordingly, an increase in the nipping width at each end in the axial direction of the pressure roller can be suppressed irrespective of the inverted crown shape of the pressure roller.

DESCRIPTION

Embodiment

Hereinafter, one embodiment of the present disclosure will be described while referring to the accompanying drawings.

Figure 1A:
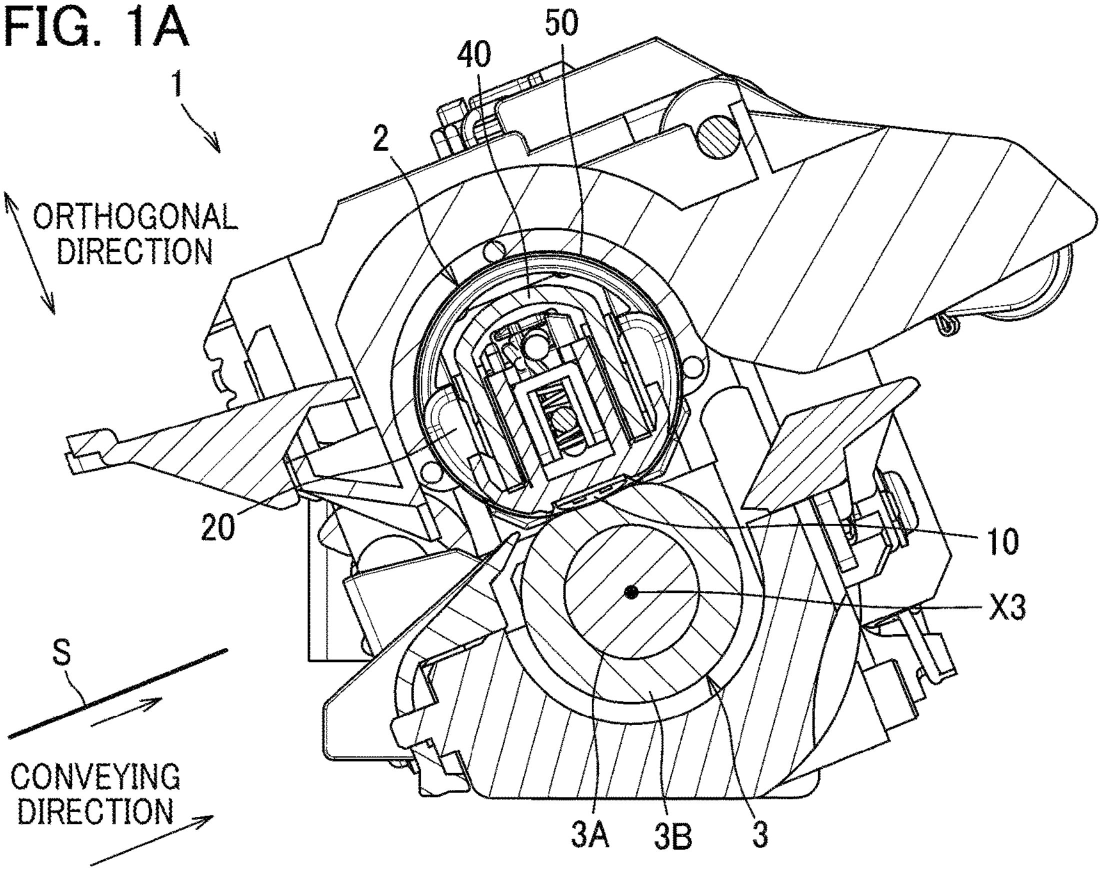
FIG. 1A is a cross-sectional view of a fixing device.

A fixing device 1 illustrated in FIG. 1A is a device configured to fix a toner image onto a sheet S. The fixing device 1 is attachable to a main body of an image-forming apparatus such as a printer. The fixing device 1 includes a heating unit 2, and a pressure roller 3.

In the following description, a conveying direction in which the sheet S is conveyed will be simply referred to as "conveying direction", and an axial direction of the pressure roller 3 will be simply referred to as "axial direction". The axial direction is parallel to a width direction of the sheet S, and is orthogonal to the conveying direction. Also, a direction orthogonal to both the conveying direction and the axial direction will be referred to as "orthogonal direction".

The heating unit 2 includes a heater 10, a holder 20, a stay 40, and a belt 50. A portion of the heater 10 is positioned in a space encircled by the belt 50. The heater 10 is configure to apply heat to a sheet S through the belt 50.

Figure 1B:
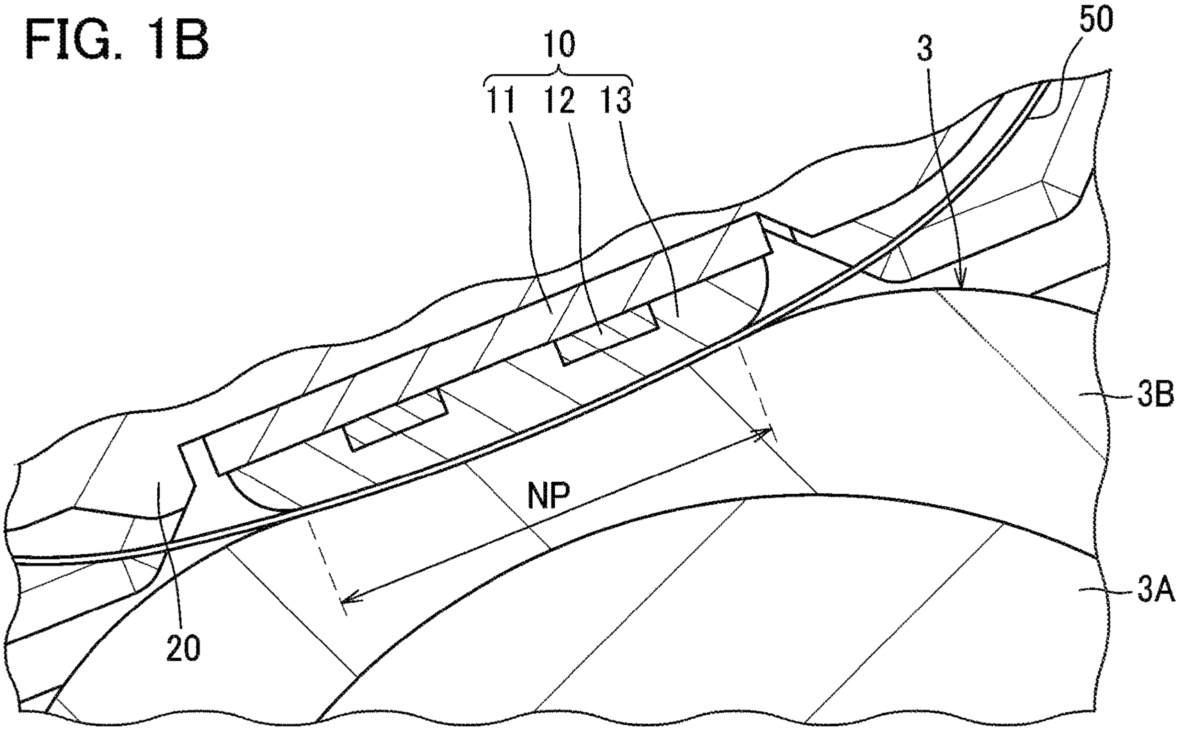
FIG. 1B is an enlarged cross-sectional view illustrating a portion in the vicinity of a heater.

As illustrated in FIG. 1B, the heater 10 includes a base plate 11, resistance heating elements 12, and a cover 13. The base plate 11 is a slender rectangular-shaped plate having two long sides and two short sides. In the present embodiment, the base plate 11 is configured of ceramic plate made of aluminum oxide. Each of the resistance heating elements 12 is provided on the base plate 11. Specifically, each of the resistance heating elements 12 is formed on one surface of the base plate 11 by printing. The cover 13 covers the resistance heating elements 12. The cover 13 is made of, for example, glass.

In the following description, a direction in which the long side of the rectangular base plate 11 extends will be referred to as "long-side direction" and a direction in which the short side of the rectangular base plate 11 extends will be referred to as "short-side direction". The long-side direction and the short-side direction are orthogonal to each other. Note that the long-side direction is a direction parallel to the axial direction, and the short-side direction is a direction parallel to the conveying direction.

Figure 2:
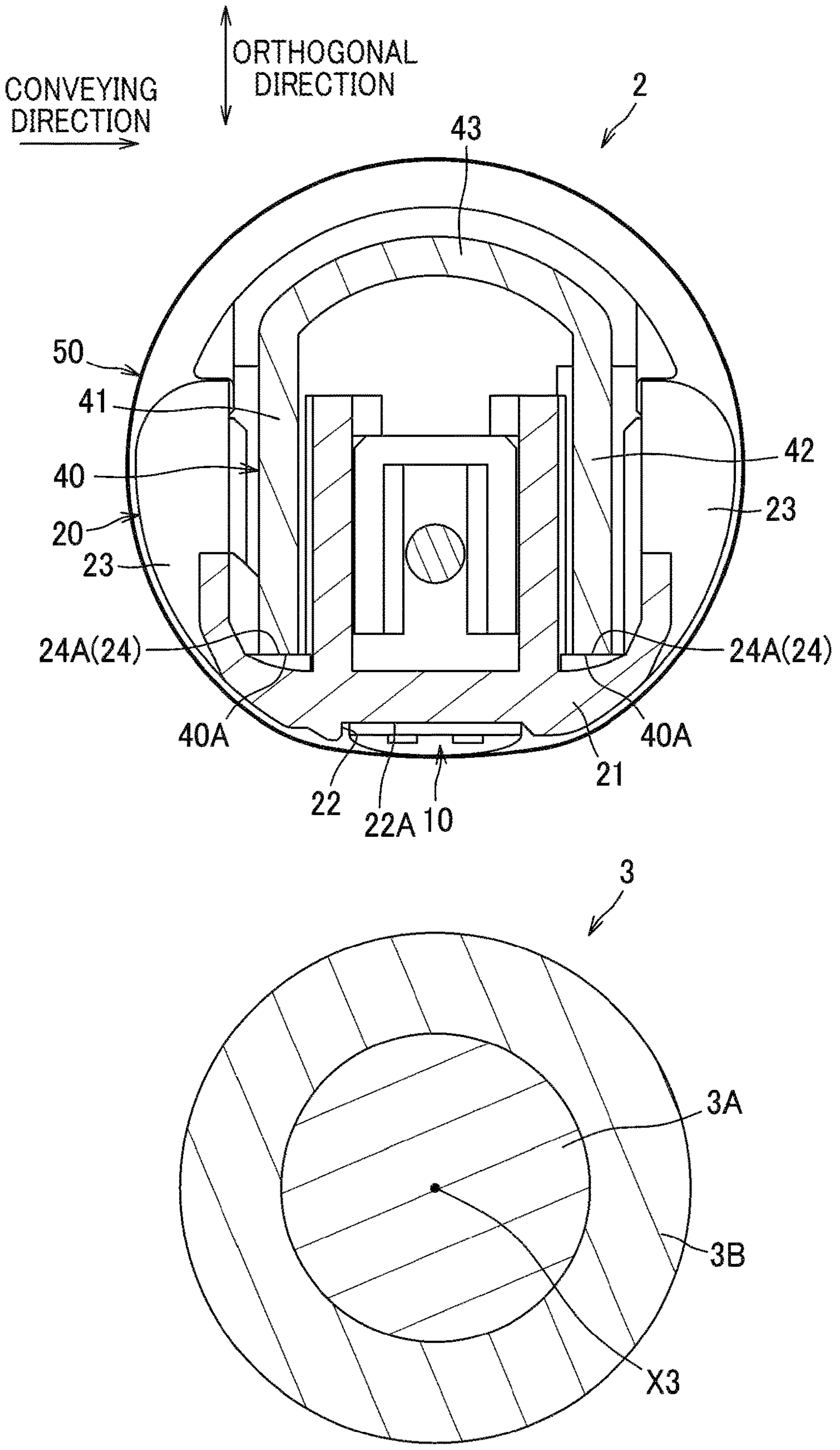
FIG. 2 is a cross-sectional view of a heating unit and a pressure roller in a state where the heating unit and the pressure roller do not form a nipping region therebetween.

As illustrated in FIG. 1A, the holder 20 supports the heater 10, and is configured to guide circular movement of the belt 50. The holder 20 is made of, for example, resin. As illustrated in FIG. 2, the holder 20 includes a base portion 21, a recess 22, belt guides 23, and a plurality of protrusions 24.

Figure 3:
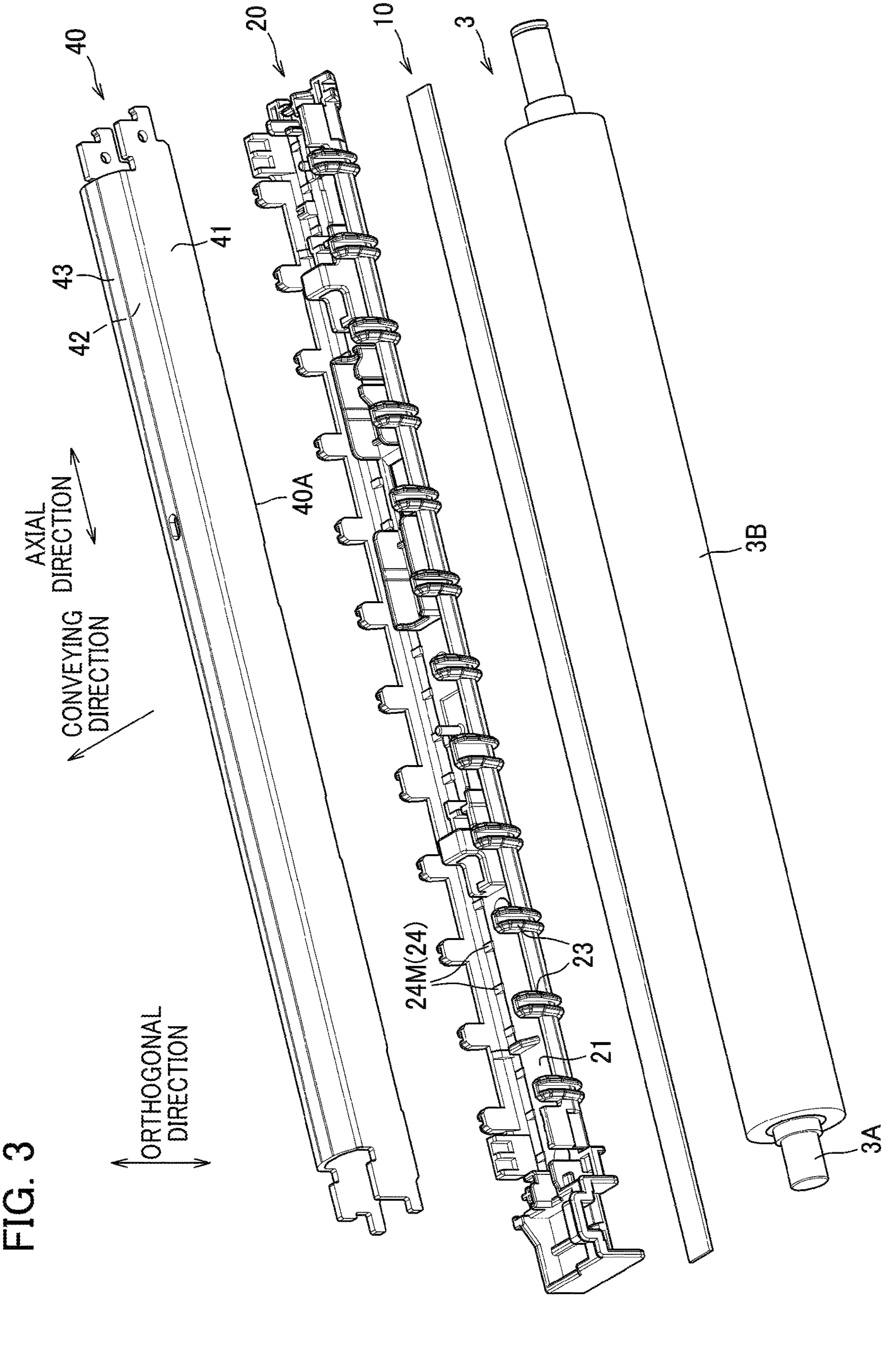
FIG. 3 is an exploded perspective view of the heating unit, and a perspective view of the pressure roller.

As illustrated in FIG. 3, the base portion 21 extends both in the conveying direction and the axial direction. Specifically, the base portion 21 has a rectangular plate shape whose longer side extends parallel to the axial direction.

As illustrated in FIG. 2, the recess 22 is formed on one surface of the base portion 21. The heater 10 is fitted in the recess 22. The recess 22 has a heater supporting surface 22A. The heater supporting surface 22A is a bottom surface of the recess 22, and supports the heater 10.

One of the belt guides 23 extends from the base portion 21 along an inner peripheral surface of the belt 50 toward the upstream side in the conveying direction, while the other of the belt guides 23 extends from the base portion 21 along the inner peripheral surface of the belt 50 toward the downstream side in the conveying direction. As illustrated in FIG. 3, each of the belt guides 23 includes a plurality of ribs arranged in the axial direction. The circular movement of the belt 50 is guided by the plurality of ribs of the belt guides 23.

Figures 4A, 4B, 4C:
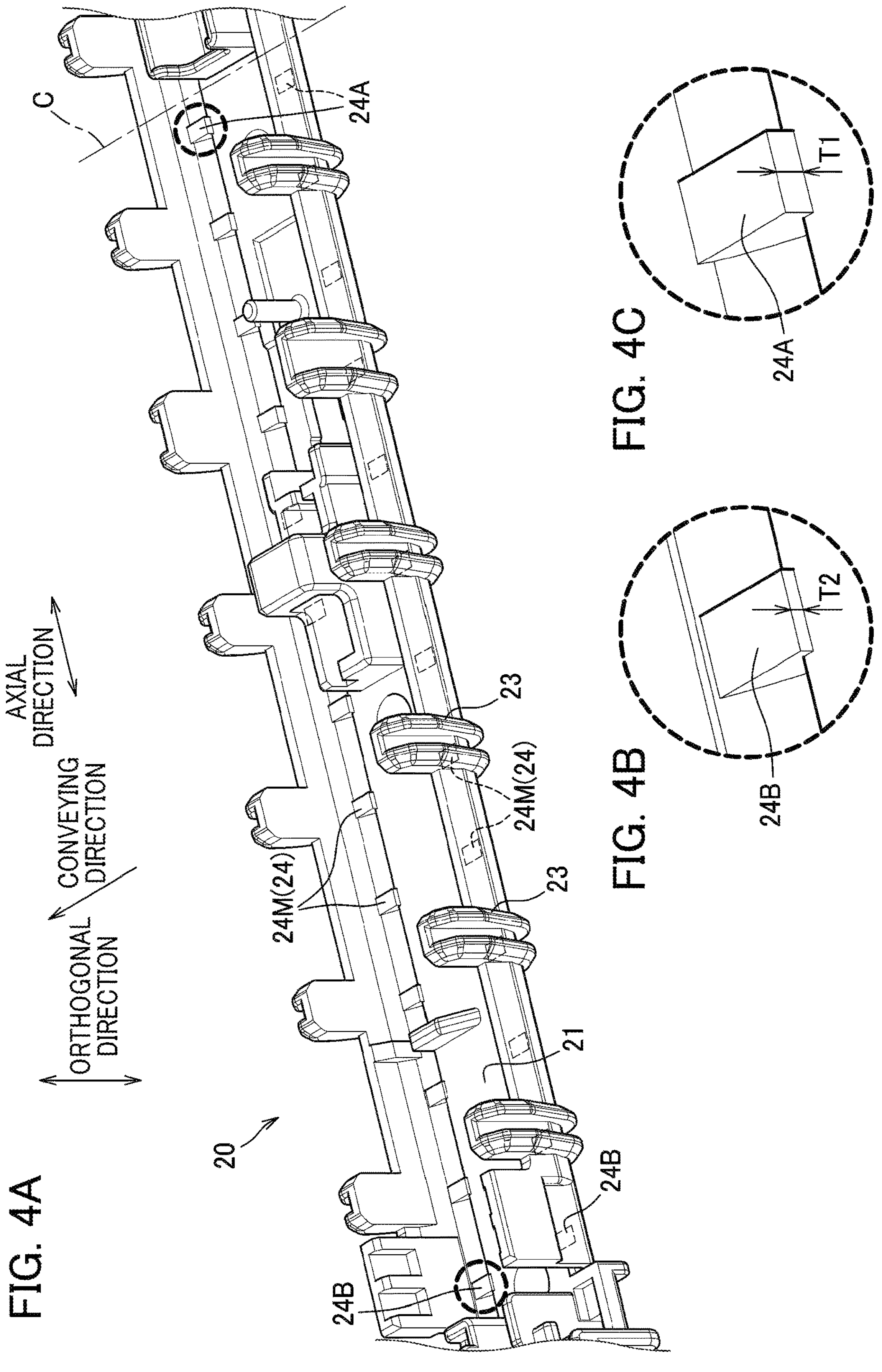
FIG. 4A is an enlarged perspective illustrating a portion of a holder.
FIG. 4B is a perspective view of a protrusion positioned at each end of the holder in an axial direction.
FIG. 4C is a perspective view of a protrusion positioned at a center of the holder in the axial direction.

As illustrated in FIG. 4, each of the plurality of protrusions 24 protrudes from the base portion 21 in a direction opposite a direction in which the heater supporting surface 22A faces. The plurality of protrusions 24 are arranged in the axial direction. Specifically, a set of the two protrusions 24 are arranged in the conveying direction, and a plurality of the sets of the two protrusions 24 are arranged in the axial direction. In the present embodiment, not less than 20 (twenty) sets of the two protrusions 24 are arranged in the axial direction at regular intervals.

The plurality of protrusions 24 include protrusions 24A positioned in the vicinity of a center C in the axial direction, and protrusions 24B positioned at each end in the axial direction. A protruding amount of each protrusion 24A, which is positioned close to the center C in the axial direction, from the base portion 21 is greater than a protruding amount of each protrusion 24B, which is positioned at each end in the axial direction, from the base portion 21. More specifically, a protruding amount T1 of the protrusion 24A which is positioned closest to the center C in the axial direction is greater than a protruding amount T2 of the protrusion 24B which is positioned farthest from the center C in the axial direction ($T2<T1$). Also, the protrusions 24 are arranged such that protruding amounts of the protrusions 24 become greater from each end in the axial direction toward the center C in the axial direction.

Each of the plurality of protrusions 24 has a rectangular distal end surface 24M. Each distal end surface 24M faces in a direction opposite the direction in which the heater supporting surface 22A faces. Each distal end surface 24M constitutes a contacting surface that is in contact with the stay 40. That is, each distal end surface 24M is an example of the contacting surface. In other words, the holder 20 has the plurality of distal end surfaces 24M constituting the contacting surface in contact with the stay 40.

Figure 5:
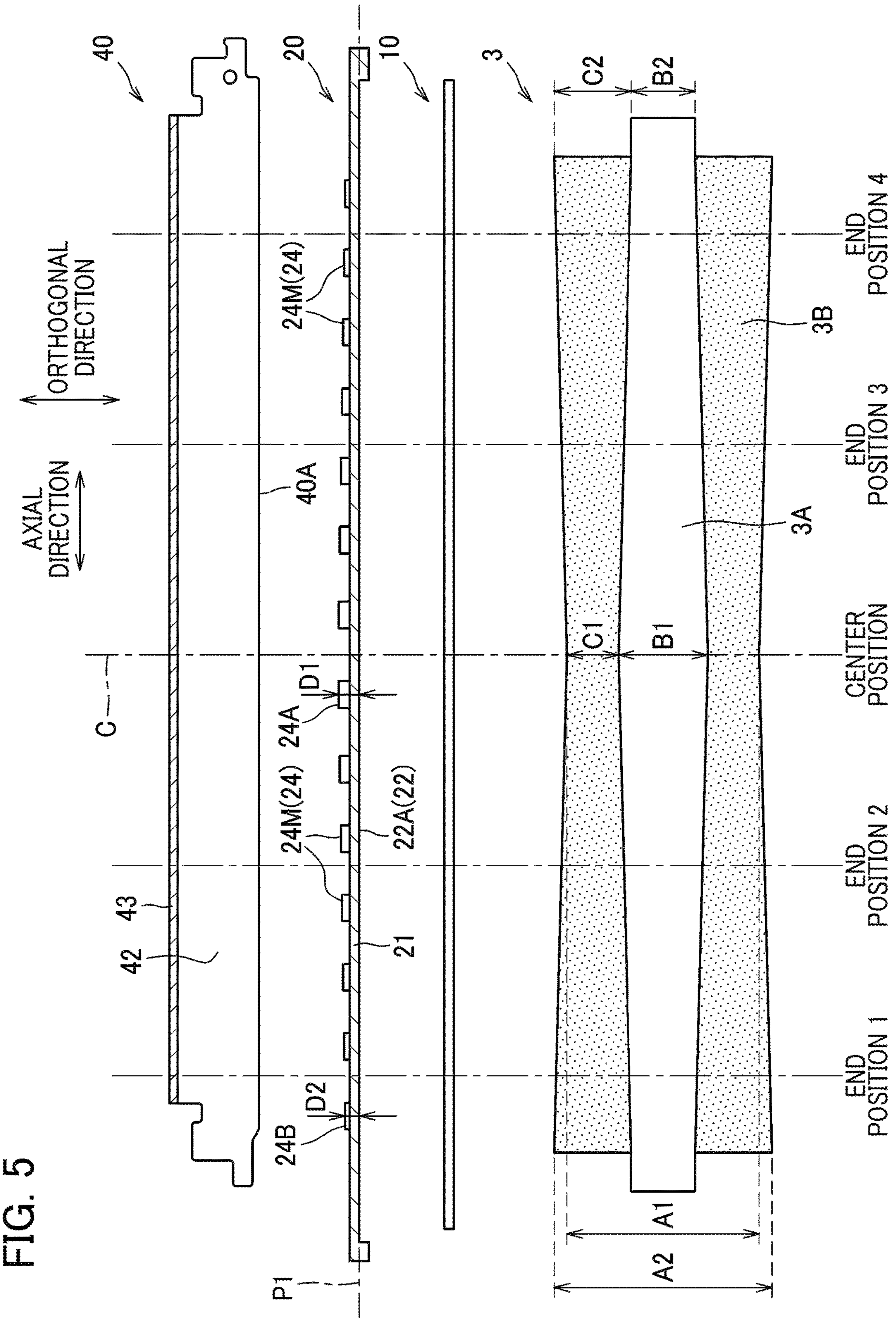
FIG. 5 is a cross-sectional view of a stay, the holder, the heater, and the pressure roller taken along a plane parallel to the axial direction.

As illustrated in FIG. 5, the plurality of distal end surfaces 24M are arranged such that the distal end surface 24M positioned at the center C protrudes further than the distal end surface 24M positioned at each end in the axial direction from a virtual plane P1. The virtual plane P1 extends parallel to both the axial direction and the conveying direction, and contains the heater supporting surface 22A. In other words, in a state prior to assembling the holder 20 with both the stay 40 and the heater 10, the distal end surfaces 24M are arranged such that the closer the distal end surface 24M is positioned to the center C, the greater a distance between the distal end surface 24M and the virtual plane P1 becomes.

In other words, in a state prior to assembling the holder 20 with both the stay 40 and the heater 10, a distance in the orthogonal direction between the distal end surfaces 24M at a center of the holder 20 in the axial direction and the heater supporting surface 22A is greater than a distance in the orthogonal direction between the distal end surfaces 24M at each end of the holder 20 in the axial direction and the heater supporting surface 22A.

Further in other words, in a state prior to assembling the holder 20 with both the stay 40 and the heater 10, a distance in the orthogonal direction between one distal end surface 24M of the distal end surfaces 24M and the heater supporting surface 22A is equal to or greater than a distance in the orthogonal direction between another one distal end surface 24M, which is positioned farther from the center of the holder 20 in the axial direction than the one distal end surface 24M is from the center of the holder 20 in the axial direction, of the distal end surfaces 24M and the heater supporting surface 22A.

Specifically, a distance D1 between the distal end surface 24M of the protrusion 24A, which is positioned closest to the center C in the axial direction, and the virtual plane P1 is greater than a distance D2 between the distal end surface 24M of the protrusion 24B, which is positioned farthest from the center C, and the virtual plane P1 (D2<D1). In other words, the distance D1 in the orthogonal direction between the distal end surface 24M of the protrusion 24A and the heater supporting surface 22A is greater than the distance D2 in the orthogonal direction between the distal end surface 24M of the protrusion 24B and the heater supporting surface 22A.

Note that a difference between the distance D2 and the distance D1 is not less than 25 μm and not more than 700 μm, for example. Preferably, the difference between the distance D2 and the distance D1 is not less than 100 μm and not more than 450 μm. More preferably, the difference between the distance D2 and the distance D1 is not less than 150 μm and not more than 350 μm.

Note that the proper value for the difference between the distance D2 and the distance D1 varies depending on a shape of the stay 40 and a shape of the pressure roller 3, and therefore is determined by conducting experiments as appropriate.

The heating unit 2 further includes a heat conductive member (not illustrated). The heat conductive member is configured to conduct heat in the long-side direction so as to provide uniform temperature along the entire length of the heater 10 in the long-side direction. The heat conductive member has a plate shape and is positioned between the heater 10 and the holder 20. The heat conductive member is made of aluminum, for example.

The stay 40 supports the holder 20. The stay 40 is made of, for example, metal. The stay 40 has a U-shape when viewed in the axial direction. Specifically, the stay 40 includes a first wall 41, a second wall 42, and a third wall 43, and has holder supporting surfaces 40A.

The first wall 41 extends in the orthogonal direction. The first wall 41 has one end in the orthogonal direction that is in contact with the distal end surfaces 24M.

The second wall 42 is arranged to be spaced apart from the first wall 41 in the conveying direction. The second wall 42 extends in the orthogonal direction. The second wall 42 has one end in the orthogonal direction that is in contact with the distal end surfaces 24M.

The third wall 43 extends in the conveying direction. The third wall 43 connects another end of the first wall 41 in the orthogonal direction and another end of the second wall 42 in the orthogonal direction to each other.

Surfaces of the one end in the orthogonal direction of the first wall 41 and the one end in the orthogonal direction of the second wall 42 serve as the holder supporting surfaces 40A. That is, the holder supporting surfaces 40A are in contact with the holder 20. The holder supporting surfaces 40A extend parallel to the axial direction.

The belt 50 is an endless belt. The belt 50 is circularly movable around the heater 10 while being guided by the holder 20. The belt 50 has an outer peripheral surface, and the inner peripheral surface. The outer peripheral surface makes contact with the pressure roller 3, or a sheet S which is a target to be heated. The inner peripheral surface makes contact with the heater 10. The belt 50 is configured to convey the sheet S in cooperation with the pressure roller 3 by circularly moving.

The pressure roller 3 is rotatable about a rotation axis X3 extending in the axial direction. The pressure roller 3 is configured to nip the belt 50, in cooperation with the heater 10 of the heating unit 2, between the pressure roller 3 and the heater 10. Further, the pressure roller 3 is configured to nip the sheet S, in cooperation with the belt 50, between the pressure roller 3 and the belt 50. The pressure roller 3 is configured to convey the sheet S in cooperation with the belt 50 by rotating.

The pressure roller 3 includes a shaft 3A, and an elastic layer 3B. The shaft 3A has a solid cylindrical shape, and is made of metal, for example. The elastic layer 3B has a hollow cylindrical shape, and is made of silicone rubber, for example. The elastic layer 3B covers an outer circumferential surface of the shaft 3A.

As illustrated in FIG. 1B, the pressure roller 3 and the belt 50 of the heating unit 2 are configured to form a nipping region NP therebetween. In the following description, a length of the nipping region NP in the conveying direction will be referred to as “nipping width”.

As illustrated in FIG. 5, the pressure roller 3 has a so-called inverted crown shape in which a diameter of the pressure roller 3 varies in the axial direction such that the diameter becomes smaller from each end of the pressure roller 3 toward a center of the pressure roller 3. Specifically, a diameter A1 of the pressure roller 3 at the center in the axial direction is smaller than a diameter A2 of the pressure roller 3 at each end in the axial direction (A1<A2). Note that a difference between the diameter A2 of the pressure roller 3 at each end in the axial direction and the diameter A1 of the pressure roller 3 at the center in the axial direction is not less than 0.1 mm and not more than 1 mm.

The shaft 3A has a diameter that varies in the axial direction such that the diameter becomes greater from each end of the shaft 3A toward a center of the shaft 3A. A diameter B1 of the shaft 3A at the center of the shaft 3A in the axial direction is greater than a diameter B2 of the shaft 3A at each end of the shaft 3A in the axial direction (B2<B1). Specifically, a difference between the diameter B1 of the shaft 3A at the center in the axial direction and the diameter B2 of the shaft 3A at each end in the axial direction is not less than 0.1 mm and not more than 9 mm.

The elastic layer 3B has a thickness that varies in the axial direction such that the thickness becomes thinner from each end of the elastic layer 3B toward a center of the elastic layer 3B. A thickness C1 of the elastic layer 3B at the center of the elastic layer 3B in the axial direction is smaller than a thickness C2 of the elastic layer 3B at each end of the elastic layer 3B in the axial direction (C1<C2). Specifically, a difference between the thickness C1 of the elastic layer 3B at the center in the axial direction and the thickness C2 of the elastic layer 3B at each end in the axial direction is not less than 0.1 mm and not more than 1 mm.

Technical Advantages of the Embodiment

With a configuration described above, the following technical advantages can be obtained according to the present embodiment.

In the fixing device 1 according to the present embodiment, the pressure roller 3 has a so-called inverted crown shape in which the diameter of the pressure roller 3 varies in the axial direction such that the diameter becomes smaller from each end of the pressure roller 3 toward the center of the pressure roller 3. With such a shape of the pressure roller 3, the fixing device 1 can convey the sheet S using the pressure roller 3 and the belt 50 while applying a stretching force to the sheet S directed from a center of the sheet S in the axial direction (the width direction) toward each end of the sheet S in the axial direction (the width direction), thereby restraining generation of wrinkles on the sheet S.

In the meantime, in a case where a pressure roller having an inverted crown shape is employed in a fixing device, there occurs a problem that the nipping width at each end of the pressure roller in the axial direction becomes greater.

However, in the fixing device 1 according to the embodiment described above, the plurality of distal end surfaces 24M, which constitutes the contacting surface, are arranged such that the closer the distal end surfaces 24M are positioned to the center in the axial direction, the greater the distance between the virtual plane P1, which extends parallel to both the axial direction and the conveying direction and containing the heater supporting surface 22A, and each distal end surface 24M becomes, thereby suppressing a nipping pressure at the center in the axial direction from becoming smaller than that at each end in the axial direction. Accordingly, an increase in the nipping width at each end in the axial direction can be suppressed irrespective of the employment of the pressure roller 3 having the inverted crown shape.

In this way, the fixing device 1 can attain a uniform nipping width along the entire length of the pressure roller 3 in the axial direction, since an increase in the nipping width at each end in the axial direction can be suppressed.

Further, since the shaft 3A of the pressure roller 3 has a diameter that varies in the axial direction such that the diameter becomes greater from each end of the shaft 3A toward the center of the shaft 3A, each end of the elastic layer 3B in the axial direction of is expanded more than the center of the elastic layer 3B in the axial direction in a case where the elastic layer 3B of the pressure roller 3 undergoes thermal expansion. Hence, a stretching force directed from the center in the axial direction toward each end in the axial direction can be applied to the sheet S being conveyed even when the elastic layer 3B undergoes thermal expansion, thereby suppressing formation of wrinkles on the sheet S.

Further, since the elastic layer 3B of the pressure roller 3 has a thickness that varies in the axial direction such that the thickness becomes smaller from each end of the elastic layer 3B toward the center of the elastic layer 3B, each end of the elastic layer 3B in the axial direction is expanded more than the center of the elastic layer 3B in the axial direction in a case where the elastic layer 3B of the pressure roller 3 undergoes thermal expansion. Accordingly, a stretching force directed from the center in the axial direction toward each end in the axial direction can be applied to the sheet S being conveyed even when the elastic layer 3B undergoes thermal expansion, thereby suppressing formation of wrinkles on the sheet S.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment described above, each of the holder supporting surfaces 40A, at which the stay 40 is in contact with the holder 20, extends parallel to the axial direction. However, the present disclosure need not be limited to the above configuration.

Figures 6A, 6B:
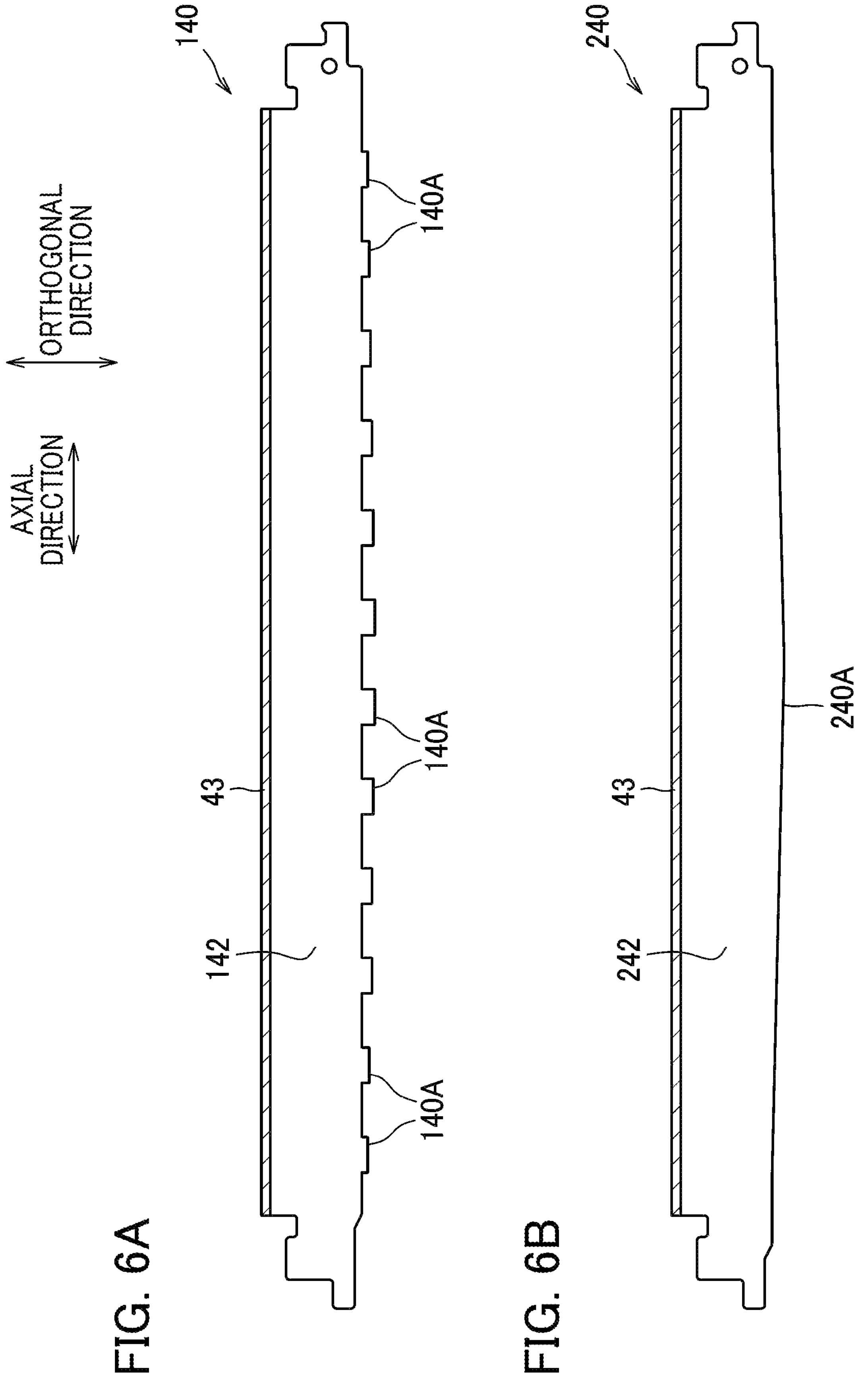
FIG. 6A is a cross-sectional view of a stay.
FIG. 6B is a cross-sectional view of a stay.

FIG. 6A illustrates a modification in which a stay 140 is employed instead of the stay 40 in the embodiment. The stay 140 includes a first wall (not illustrated) and a second wall 142, and has a holder supporting surface 140A in contact with the holder 20. The stay 140 also includes a plurality of protrusions each protruding in the orthogonal direction from the second wall 142. The protrusions are arranged in the axial direction such that the closer the protrusions are positioned to the center C, the greater a protruding amount of the protrusions become.

Each of the protrusions of the second wall 142 has an end surface, and the holder supporting surface 140A is constituted by the end surfaces of the protrusions. That is, the holder supporting surface 140A has such a shape that a center of the holder supporting surface 140A in the axial direction protrudes further than each end of the holder supporting surface 140A in the axial direction does.

Note that, although not illustrated in detail in the drawings, the first wall (not illustrated) has a configuration similar to the second wall 142 of this modification.

According to the modification in FIG. 6A, the stay 140 has such a shape that the holder supporting surface 140A at a center of the stay 140 in the axial direction protrudes further than the holder supporting surface 140A at each end of the stay 140 in the axial direction does, thereby restraining an increase in the nipping width at each end in the axial direction irrespective of the inverted crown shape of the pressure roller 3.

FIG. 6B illustrates another modification in which a stay 240 is employed instead of the stay 40 in the embodiment or the stay 140 in the modification in FIG. 6A. The stay 240 includes a first wall (not illustrated) and a second wall 242, and has a holder supporting surface 240A in contact with the holder 20. The second wall 242 has an end surface extending continuously in the axial direction and serving as the holder supporting surface 240A. A protruding amount of the holder supporting surface 240A varies in the axial direction such that the protruding amount becomes greater from each end of the holder supporting surface 240A toward a center of the holder supporting surface 240A. That is, the holder supporting surface 240A has such a shape that the center of the holder supporting surface 240A in the axial direction protrudes further than each end of the holder supporting surface 240A in the axial direction does.

Note that, although not illustrated in detail in the drawings, the first wall (not illustrated) has a configuration similar to the second wall 242 of this modification.

Also in this modification illustrated in FIG. 6B, the stay 240 has such a shape that the holder supporting surface 240A at a center of the stay 240 in the axial direction protrudes further than the holder supporting surface 240A at each end of the stay 240 in the axial direction does. Accordingly, an increase in the nipping width at each end in the axial direction can be restrained irrespective of the inverted crown shape of the pressure roller 3.

In the embodiment described above, the heater supporting surface 22A of the holder 20 extends parallel to the axial direction. However, the present disclosure need not be limited to this configuration.

Figure 7A:
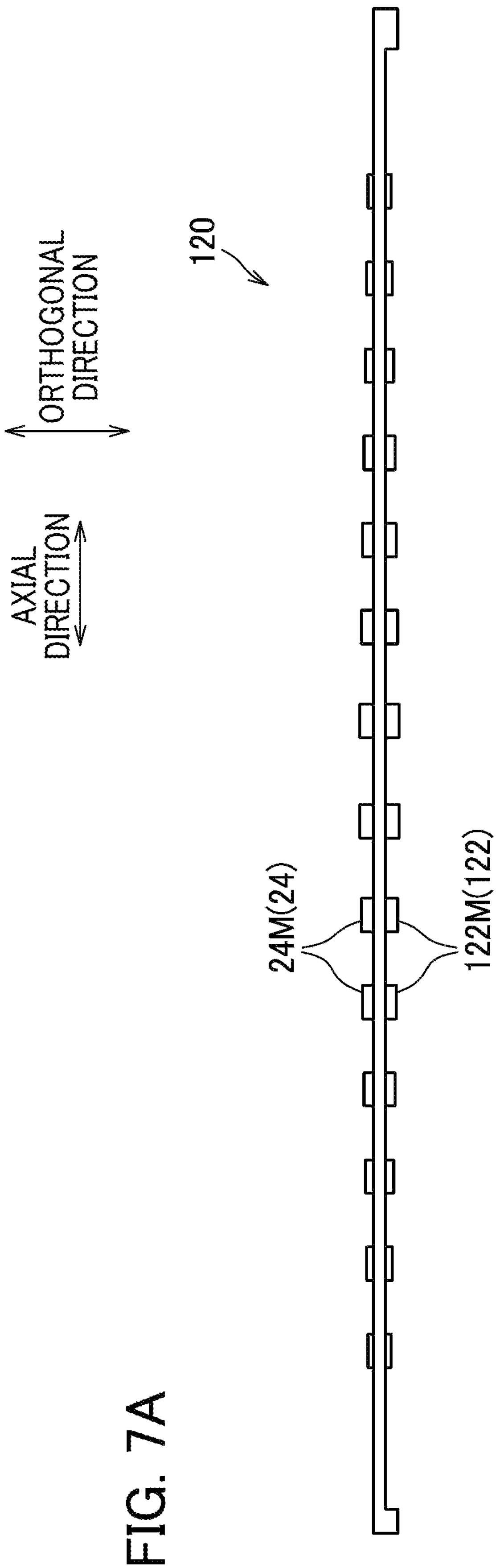
FIG. 7A is a cross-sectional view of a holder.

FIG. 7A illustrates a modification in which a holder 120 is employed instead of the holder 20 in the embodiment. In this modification, the holder 120 includes a plurality of protrusions 122 arranged in the axial direction, and has a heater supporting surface 122M. Each of the plurality of protrusions 122 protrudes in the orthogonal direction.

In a state prior to assembling the holder 120 with both the stay 40 and the heater 10, the protrusions 122 are arranged such that the closer the protrusions 122 are positioned to the center C, the greater a protruding amount of the protrusions 122 become. Each of the protrusions 122 has an end surface, and the heater supporting surface 122M are constituted by end surfaces of the protrusions 122. That is, in a state prior to assembling the holder 120 with both the stay 40 and the heater 10, the heater supporting surface 122M has such a shape that a center of the heater supporting surface 122M in the axial direction protrudes further than each end of the heater supporting surface 122M in the axial direction does.

With the modification illustrated in FIG. 7A, since the holder 120 has such a shape that the heater supporting surface 122M at a center of the holder 120 in the axial direction protrude further than the heater supporting surface 122M at each end of the holder 120 in the axial direction does, an increase in the nipping width at each end in the axial direction can be restrained irrespective of the inverted crown shape of the pressure roller 3.

Figure 7B:
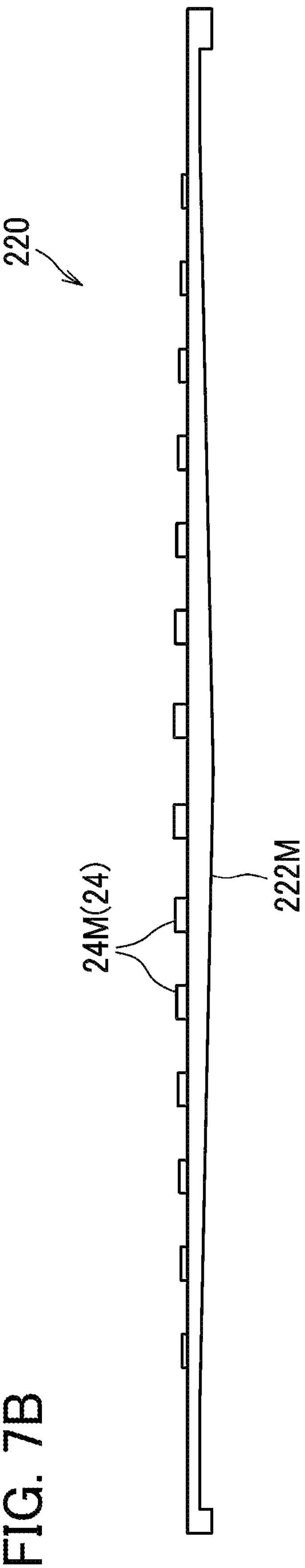
FIG. 7B is a cross-sectional view of a holder.

FIG. 7B illustrates another modification in which a holder 220 is employed in place of the holder 20 in the embodiment or the holder 120 in the modification in FIG. 7A. The holder 220 has a heater supporting surface 222M extending continuously in the axial direction. Specifically, the holder 220 has an end surface that serves as the heater supporting surface 222M.

In a state prior to assembling the holder 220 with both the stay 40 and the heater 10, a protruding amount of the heater supporting surface 222M varies in the axial direction such that the protruding amount becomes greater from each end of the heater supporting surface 222M toward a center of the heater supporting surface 222M. That is, in a state prior to assembling the holder 220 with both the stay 40 and the heater 10, the heater supporting surface 222M has such a shape that the center of the heater supporting surface 222M in the axial direction protrudes further than each end of the heater supporting surface 222M in the axial direction does.

With the configuration in the modification of FIG. 7B in which the holder 220 has such a shape that the heater supporting surface 222M at a center of the holder 220 in the axial direction protrudes further than the heater supporting surface 222M at each end of the holder 220 in the axial direction does, the nipping width at the center in the axial direction can be restrained from becoming smaller than that at each end in the axial direction. Accordingly, this configuration can restrain the nipping width at each end in the axial direction from becoming greater irrespective of the inverted crown shape of the pressure roller 3.

Although the shaft 3A of the pressure roller 3 has such a shape that the diameter of the shaft 3A becomes greater from each end in the axial direction toward the center in the axial direction in the embodiment described above, the present disclosure need not be limited to this configuration.

Figure 8A:
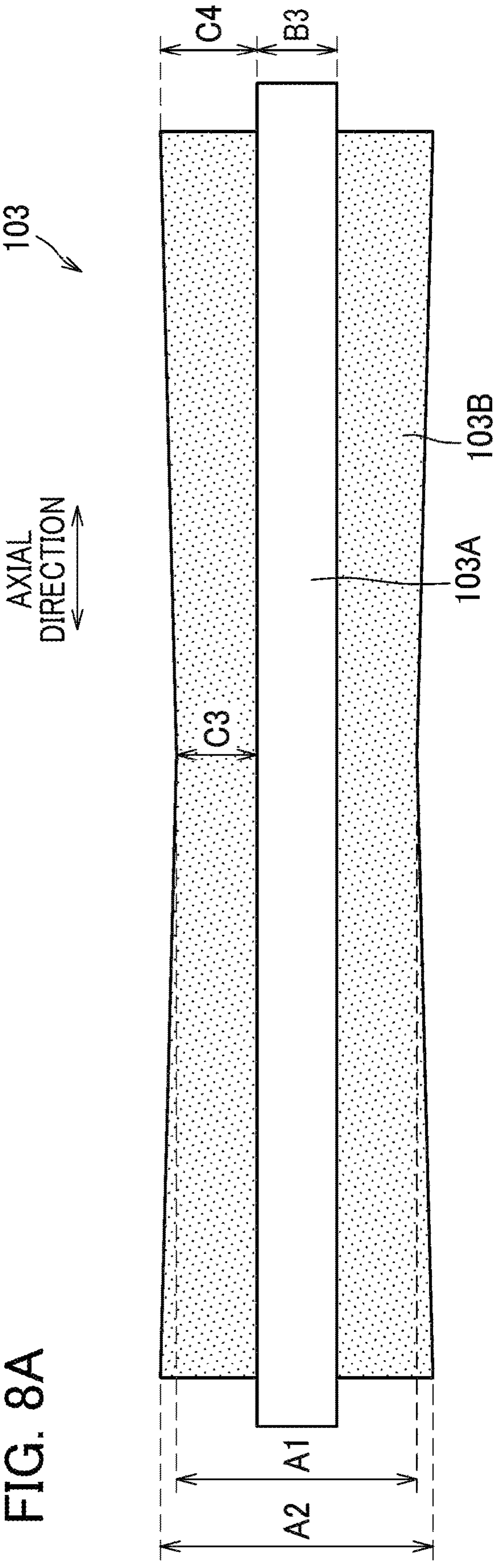
FIG. 8A is a cross-sectional view of a pressure roller.

FIG. 8A illustrates a modification in which a pressure roller 103 is employed instead of the pressure roller 3 in the embodiment. The pressure roller 103 includes a shaft 103A, and an elastic layer 103B. The shaft 103A has a diameter B3 that is uniform along the entire length of the shaft 103A in the axial direction. The elastic layer 103B has a thickness that varies in the axial direction such that the thickness becomes thinner from each end of the elastic layer 103B toward a center of the elastic layer 103B. A thickness C3 of the elastic layer 103B at the center of the elastic layer 103B in the axial direction is smaller than a thickness C4 of the elastic layer 103B at each end of the elastic layer 103B in the axial direction (C3<C4).

Similar to the embodiment described above, the pressure roller 103 in this modification can restrain increase in the nipping width at each end of the pressure roller 103 in the axial direction.

Figure 8B:
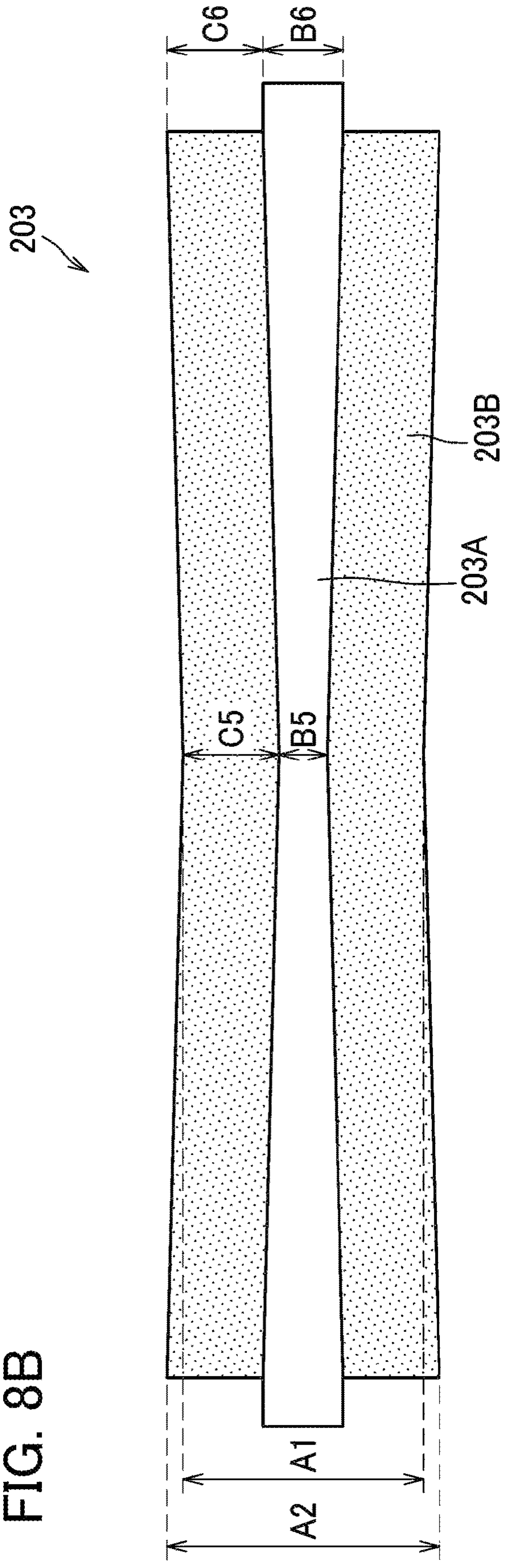
FIG. 8B is a cross-sectional view of a pressure roller.

FIG. 8B illustrates another modification in which a pressure roller 203 is employed instead of the pressure roller 3 in the embodiment or the pressure roller 103 in the modification in FIG. 8A. The pressure roller 203 includes a shaft 203A, and an elastic layer 203B. The shaft 203A has a diameter that varies in the axial direction such that the diameter becomes smaller from each end of the shaft 203A toward a center of the shaft 203A. A diameter B5 of the shaft 203A at the center in the axial direction is smaller than a diameter B6 of the shaft 203A at each end in the axial direction (B5<B6). A thickness C5 of the elastic layer 203B at the center in the axial direction is substantially equal to a thickness C6 of the elastic layer 203B at each end in the axial direction (C5=C6).

Similar to the embodiment described above, the pressure roller 203 can restrain the nipping width at each end of the pressure roller 203 in the axial direction from becoming greater than that at the center in the axial direction.

In the embodiment described above, not less than 20 (twenty) protrusions 24 are arranged in the axial direction at regular intervals. However, the number of the protrusions 24 arranged in the axial direction at regular intervals may be less than 20 (twenty).

In the embodiment described above, the contacting surface, which makes contact with the stay 40, is configured of the distal end surfaces 24M of the plurality of protrusions 24. However, other configurations may be employed. For example, the plurality of protrusions 24 may be omitted, and another surface of the base portion 21 of the holder 20 that faces the stay 40 (an opposite surface of the one surface of the base portion 21) may make contact with the stay 40. In this case, the other surface of the base portion 21 serves as the contacting surface.

The elastic layer 3B of the pressure roller 3 may be made of a material other than silicone rubber. Further, the holder 20 may be made of a material other than resin. Still further, the stay 40 may be made of a material other than metal.

Parts and components used in the embodiment and modifications described above may be suitably combined to be implemented.

EXAMPLES

Hereinafter, examples according to the present disclosure will be described.

<Evaluation Method>

Three fixing devices according to an example 1 and an example 2 of the present disclosure, and a comparative example were prepared. The nipping width, which is the length in the conveying direction of the nipping region NP formed between the pressure roller 3 and the heating unit 2, was measured in each of the above three fixing devices.

In each fixing device, the nipping width was measured at five positions with respect to the axial direction, i.e., an end position 1, an end position 2, a center position, an end position 3, and an end position 4 which are illustrated in FIG. 5. The end position 2 was centrally positioned between the end position 1 and the center position in the axial direction. The end position 3 was centrally positioned between the center position and the end position 4 in the axial direction.

In the example 1, a difference ΔT in a protruding amount between the center in the axial direction of the holder 20 and each end in the axial direction of the holder 20 was 150 μm.

In the example 2, the difference ΔT in the protruding amount between the center in the axial direction of the holder 20 and each end in the axial direction of the holder 20 was 350 μm.

In the comparative example, the difference ΔT in the protruding amount between the center in the axial direction of the holder 20 and each end in the axial direction of the holder 20 was 0 (zero) μm.

Note that the difference ΔT in the protruding amount denotes the difference between the distance D1 between the virtual plane P1, which extends parallel to both the axial direction and the conveying direction and containing the heater supporting surface 22A, and the distal end surface 24M (constituting the contacting surface) at the center C in the axial direction and the distance D2 between the virtual plane P1 and the distal end surface 24M (constituting the contacting surface) at each end in the axial direction ($\Delta T = D1 - D2$).

<Measurement Results>

Figures 9A, 9B:
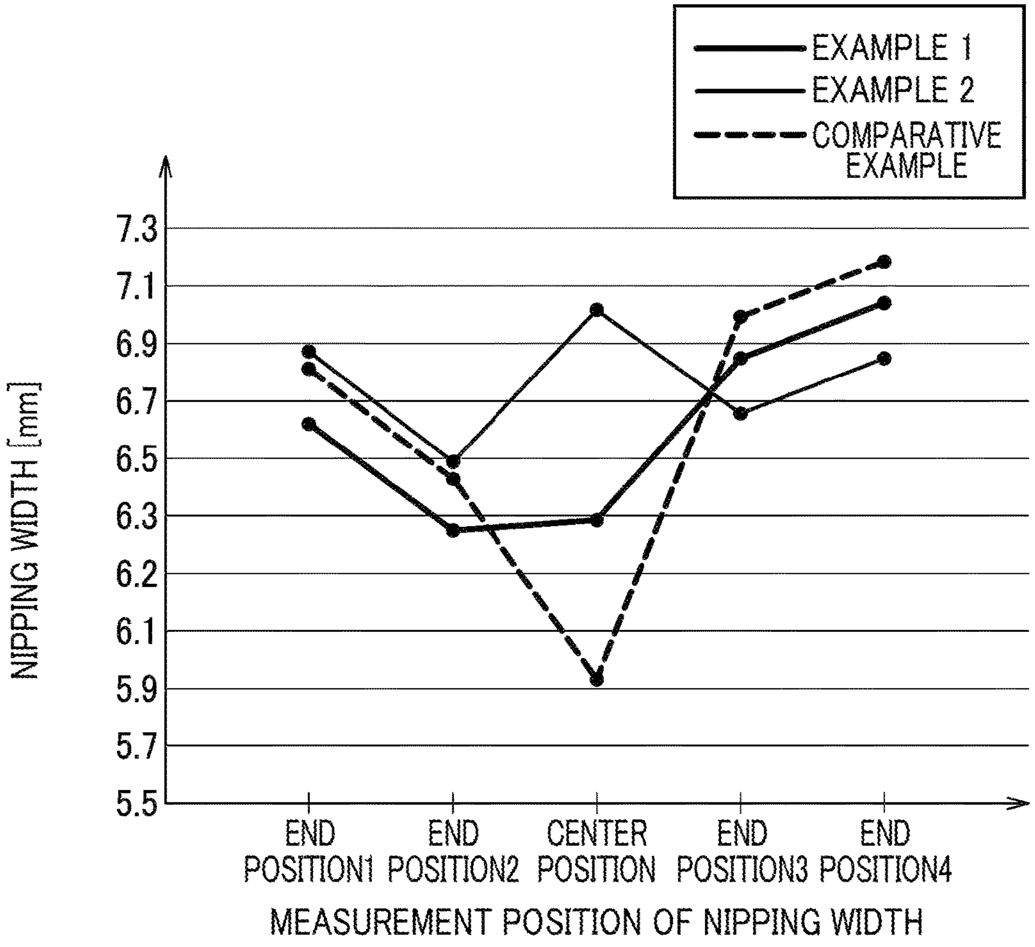
FIG. 9A is a table showing measurement results as to a nipping width at each position with respect to the axial direction in an example 1, an example 2, and a comparative example.
FIG. 9B is a graph showing the measurement results.

A table in FIG. 9A and a graph in FIG. 9B show measurement results as to the nipping width in the fixing devices according to the example 1, the example 2, and the comparative example.

Note that, in each fixing device, the base plate 11 of the heater 10 had a length of 7±0.2 mm in the short-side direction, and the cover 13 of the heater 10 had a length of 6.4 mm in the short-side direction.

In the comparative example, the nipping width at the center position was smallest, and the nipping width became grater from the center position toward the end positions 1 and 4. That is, in the comparative example, the nipping width at the end positions 1 and 4 was much greater than the nipping width at the center position. Accordingly, in the fixing device according to the comparative example, uniform fixing performance in the widthwise direction of the sheet S cannot be expected.

In the example 1, the nipping width at the end positions 1 and 4 was greater than the nipping width at the center position. However, a difference in the example 1 between the nipping width at the end positions 1 and 4 and the nipping width at the center position was less than the difference in the comparative example. Accordingly, in the fixing device according to the example 1, relative uniform fixing performance can be expected over the entire area of the sheet S in the widthwise direction.

In the example 2, the nipping width at the center position was approximately the same as the nipping width at the end positions 1 and 4. Further, the nipping width at the end position 2 and 3 was smaller than the nipping width at the end positions 1 and 4. Accordingly, in fixing device according to the example 2, relatively uniform fixing performance can be expected over the entire area of the sheet S.

The above results indicate that the difference ΔT is preferably not less than 150 μm and not more than 350 μm.

What is claimed is:

1. A fixing device comprising:

an endless belt;

a heater positioned in a space encircled by the endless belt, the heater comprising:

a base plate; and a resistance heating element provided on the base plate;

a holder holding the heater, the holder having:

a heater supporting surface supporting the heater; and a contacting surface opposite the heater supporting surface;

a stay in contact with the contacting surface; and a pressure roller rotatable about a rotation axis extending in an axial direction, the pressure roller being configured to nip the endless belt between the pressure roller and the heater, the pressure roller comprising:

a shaft; and an elastic layer covering an outer circumferential surface of the shaft, wherein the pressure roller has a diameter that varies in the axial direction such that the diameter becomes smaller from each end of the pressure roller toward a center of the pressure roller, and wherein, in a state prior to assembling the holder with both the stay and the heater, a distance in an orthogonal direction between the heater supporting surface and the contacting surface at a center of the holder in the axial direction is longer than a distance in the orthogonal direction between the heater supporting surface and the contacting surface at each end of the holder in the axial direction, the orthogonal direction being orthogonal to the axial direction.

2. The fixing device according to claim 1, wherein the shaft has a diameter that varies in the axial direction such that the diameter becomes greater from each end of the shaft toward a center of the shaft.

3. The fixing device according to claim 1,
wherein the elastic layer has a thickness that varies in the axial direction such that the thickness becomes thinner from each end of the elastic layer toward a center of the elastic layer.

4. The fixing device according to claim 1,
wherein the holder comprises protrusions arranged in the axial direction, each protrusion protruding in a direction opposite a direction in which the heater supporting surface faces, and
wherein the contacting surface is constituted by distal end surfaces of the protrusions.

5. The fixing device according to claim 4,
wherein a protruding amount of a protrusion of the protrusions that is at the center of the holder in the axial direction is greater than a protruding amount of a protrusion of the protrusions that is at each end of the holder in the axial direction.

6. The fixing device according to claim 1,
wherein a difference between a first distance and a second distance is not less than 25 μm and not more than 700 μm, the first distance being a distance in the orthogonal direction between the heater supporting surface and the contacting surface at the center of the holder in the axial direction, the second distance being a distance in the orthogonal direction between the heater supporting surface and the contacting surface at each end of the holder in the axial direction.

7. The fixing device according to claim 3,
wherein a difference between a first thickness and a second thickness is not less than 0.1 mm and not more than 1 mm, the first thickness being the thickness of the elastic layer at the center of the elastic layer in the axial direction, the second thickness being the thickness of the elastic layer at each end of the elastic layer in the axial direction.

8. The fixing device according to claim 2,
wherein a difference between a first diameter and a second diameter is not less than 0.1 mm and not more than 9 mm, the first diameter being the diameter of the shaft at the center of the shaft in the axial direction, the second diameter being the diameter of the shaft at each end of the shaft in the axial direction.

9. The fixing device according to claim 1,
wherein the stay comprises:
a first wall extending in the orthogonal direction, one end of the first wall in the orthogonal direction being in contact with the contacting surface; and
a second wall extending in the orthogonal direction, one end of the second wall in the orthogonal direction being in contact with the contacting surface, the second wall being arranged to be spaced apart from the first wall in a direction orthogonal to both the axial direction and the orthogonal direction.

10. The fixing device according to claim 9,
wherein the stay further comprises:
a third wall connecting another end of the first wall in the orthogonal direction and another end of the second wall in the orthogonal direction to each other, and
wherein the stay has a U-shape when viewed in the axial direction.

11. The fixing device according to claim 1,
wherein the stay has a holder supporting surface in contact with the holder, and
wherein the holder supporting surface at a center of the stay in the axial direction protrudes further than the holder supporting surface at each end of the stay in the axial direction does.

12. The fixing device according to claim 1,
wherein, in a state prior to assembling the holder with both the stay and the heater, the heater supporting surface at the center of the holder in the axial direction protrudes further than the heater supporting surface at each end of the holder in the axial direction does.

13. A fixing device comprising:
an endless belt;
a heater positioned in a space encircled by the endless belt, the heater comprising:
a base plate; and
a resistance heating element provided on the base plate;
a holder holding the heater, the holder having:
a heater supporting surface supporting the heater; and
a plurality of contacting surfaces opposite the heater supporting surface;
a stay in contact with each contacting surface; and
a pressure roller rotatable about a rotation axis extending in an axial direction, the pressure roller being configured to nip the endless belt between the pressure roller and the heater, the pressure roller comprising:
a shaft; and
an elastic layer covering an outer circumferential surface of the shaft,
wherein the pressure roller has a diameter that varies in the axial direction such that the diameter becomes smaller from each end of the pressure roller toward a center of the pressure roller, and
wherein, in a state prior to assembling the holder with both the stay and the heater, a distance in an orthogonal direction between the heater supporting surface and a first contacting surface of the contacting surfaces is longer than a distance in the orthogonal direction between the heater supporting surface and a second contacting surface of the contacting surfaces, the first contacting surface being positioned closer to a center of the holder in the axial direction than the second contacting surface is to the center of the holder in the axial direction, the orthogonal direction being orthogonal to the axial direction.

* * * * *